United States Patent [19]

Warburg

[11] Patent Number: 4,697,346
[45] Date of Patent: Oct. 6, 1987

[54] YARN GAUGE

[76] Inventor: Tessa E. Warburg, The Old Vicarage, Godney, Wells, Somerset, BA51RX, England

[21] Appl. No.: 844,704

[22] Filed: Mar. 27, 1986

[51] Int. Cl.[4] .................................................. G01B 5/08
[52] U.S. Cl. ..................................... 33/1 BB; 33/563; 33/502
[58] Field of Search ................ 33/563, 562, 1 BB, 565

[56] References Cited

U.S. PATENT DOCUMENTS

| 2,375,427 | 5/1945 | Mannino | 33/1 B |
| 2,376,811 | 5/1945 | Rigby | 33/1 B |
| 3,106,778 | 10/1963 | Stoneham | 33/1 B |

OTHER PUBLICATIONS deDillmont 1909, Encyclopedia of Needlework, Mulhouse, France.
Official Guide and Catalogue of the 2nd National Knitting Exhibition (p. 22) World of Knitting, P.O. Box 8, Abergavenny, Gwent, NP78UP, U.K.
Knit and Stitch Magazine, Jul. 1985, p. 4.
Machine Knitting News, Aug. 1985, pp. 221, P.O. Box 7, Stratford-upon-Avon Warwickshire CV38RS U.K.
World of Knitting, Aug. 1985, pp. 14 and 29.
Pins, Aug. 1985, p. 22.
Knitting and Sewing Machine Times, Oct. 1985, p. 24.
Machine Knitting Monthly, Apr. 1986, pp. 4 and 10.

Primary Examiner—William D. Martin, Jr.

[57] ABSTRACT

The invention features a device for gauging the category to which a length of yarn belongs. The device comprises a flat sheet having a plurality of elongated transparent regions. Each region corresponds in width and contour to a length of yarn from a specific category of yarn, when the length is pulled to lie in a straight line.

7 Claims, 1 Drawing Figure

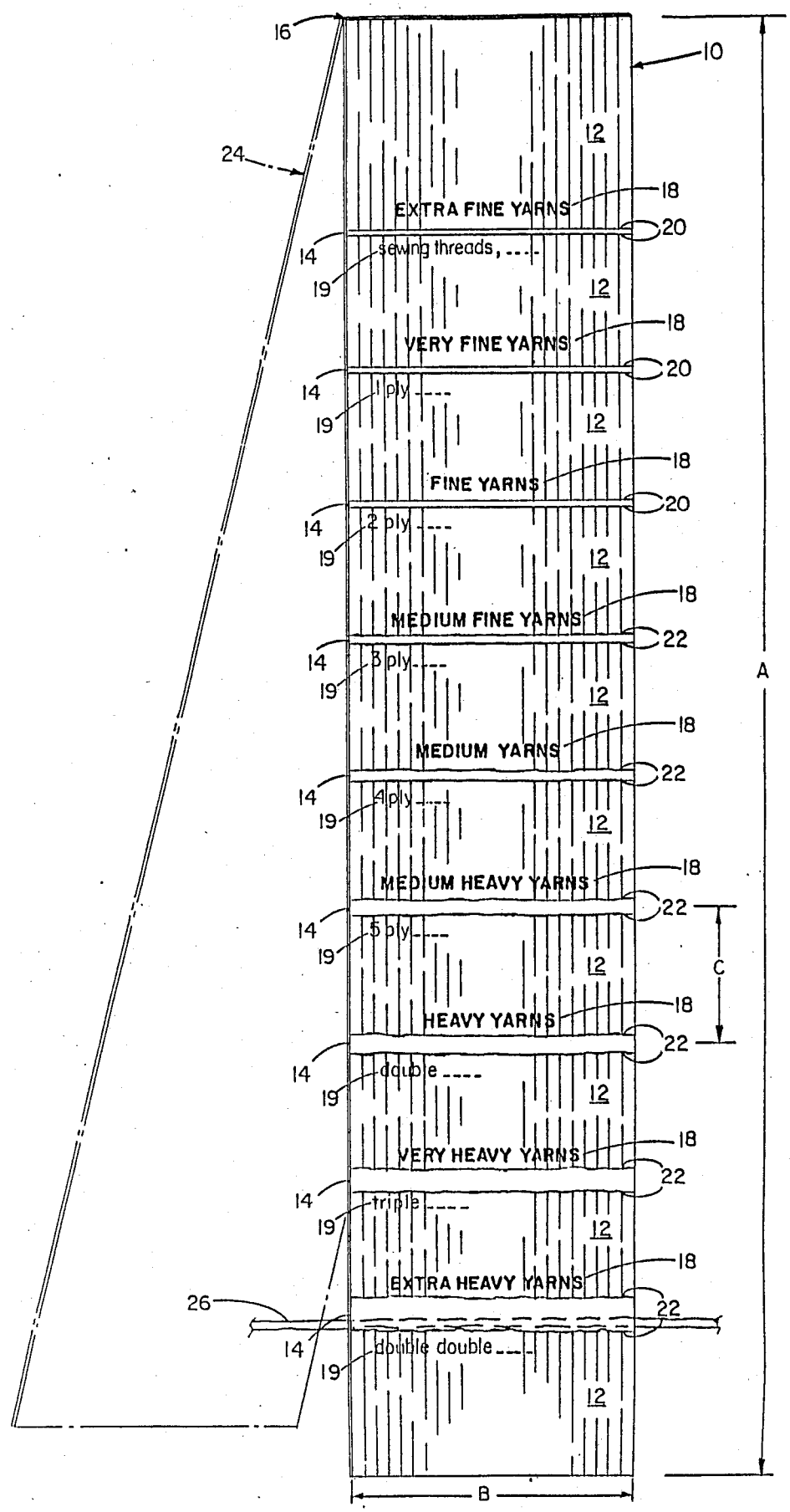

YARN GAUGE

BACKGROUND OF THE INVENTION

The invention relates to devices for gauging the category (range of thickness) to which a length of yarn belongs.

Yarns, used by textile crafters, and as defined by Lorant (1984, *YARNS FOR TEXTILE CRAFTS*, Van Nostrand Reinhold Co. Inc., 135 West 50th Street, New York, NY 10020), incorporated herein by reference, include sewing threads, lace threads, weaving yarns, and knitting and crocheting yarns spun from various fibers. In order to work efficiently, crafters need to know in which category a desired yarn belongs. Gauges to establish the category of a specific yarn include one published by the firm of DMC (France) for many of their yarns, which is a page of white paper on which a series of rectangular dark sections of equal length but variable width are printed. The yarn to be measured is placed over the various sections. The dark section best covered by the yarn indicates its category.

SUMMARY OF THE INVENTION

In general the invention features a yarn gauging device which has a sheet with a plurality of opaque regions and a plurality of elongated transparent regions delineated by the opaque regions; each transparent region corresponds in width and contour to the thickness and character of yarn falling within a given category, so that when the length of yarn is viewed through the transparent regions, its category can be gauged.

In preferred embodiments, the device is rectangular, has markings describing the category corresponding to each transparent region, and is made of polyvinyl chloride, the opaque regions are printed onto the surface of the device, and the device is attached to a second sheet at one edge and the length of yarn is held between the two sheets for gauging.

The gauge provides a simple, accurate, and effective way to estimate yarn width by applying the gauge to the yarn to be tested and finding the transparent region corresponding to the width of the yarn. The width can be read from the markings on the yarn gauge.

Other features and advantages of the invention will be apparent from the following description of the preferred embodiments and from the claims.

DESCRIPTION OF THE PREFERRED EMBODIMENTS

The drawing shows a yarn gauge in accordance with the invention.

Structure

Referring to the drawing, gauge 10 is rectangular in shape with length A of 24 cm. and width B of 5 cm. Gauge 10 is constructed from a flat polyvinyl chloride sheet of thickness 0.07 cm. Areas 12 consist of opaque material delineating transparent areas 14 on gauge 10. The distances between the edges of adjacent areas 12 are varied to give a range of widths of transparent areas 14. Notations 18 on areas 12 described the yarn categories corresponding to the respective areas 14. The edges of opaque areas 12 may be straight lines 20 or wavy lines 22 reflecting the character (smooth or not) of the yarn.

Preferred widths of transparent regions 14 are widths appropriate to the following categories: extra fine, very fine, fine, medium fine, medium, medium heavy, heavy, very heavy, and extra heavy. The categories are also described by markings 19 using names familiar to specific textile crafters in specific, countries, such as knitters in the UK, e.g., 1 ply, 2 ply, double knitting, triple knitting, etc.

Opaque material 12 is printer's ink, applied by screen printing. Notations 18, 19 are applied on top of opaque material 12 using printer's ink applied by screen printing, so that the user can readily relate a region to a familiar yarn category. Other markings, for example giving instructions on how to use the gauge, may also be present.

Use

Yarn 26 to be gauged is laid on a flat surface and straightened, but not stretched. The yarn gauge is placed on top of the yarn and is moved over the yarn until the transparent region corresponding to the width of the yarn is judged to be found. In the drawing yarn 26 is shown beneath the region corresponding to extra heavy yarns, and the gauge will need to be moved until a more closely corresponding region covers yarn 26. The gauge is then lightly pressed on the yarn; if that category still appears to be the closest fit to the width of the yarn, the yarn category is read from the markings on the gauge.

Alternative Embodiments

Other embodiments are within the following claims:

Gauge 10 may be attached by hinge 16 to a second surface 24 so that yarn may be placed between the two surfaces and measured. The second surface may be marked, as described above for gauge 10, or may be of opaque or transparent material. Preferably the second surface is constructed of the same material as gauge 10 and is opaque. Sheets 10, 24 are formed from a single piece of material with a hinge line 16 defining the two sheets.

Gauge 10 can be circular in shape with the markings of opaque material radiating from its center.

I claim:

1. A device for gauging the category to which a length of yarn belongs, comprising:
   a sheet having
   a plurality of opaque regions, and a plurality of elongated transparent regions delineated by said opaque regions, said transparent regions having different widths and contour corresponding respectively to the thicknesses and character of yarns falling within different said categories,
   whereby when said length of yarn is viewed through said transparent regions, its category can be gauged.

2. The device of claim 1, wherein said sheet is rectangular.

3. The device of claim 1 wherein said sheet further comprises markings describing the category corresponding to each said transparent region.

4. The device of claim 1 wherein said sheet comprises a transparent surface to which said opaque regions are applied.

5. The device of claim 1 wherein said sheet comprises polyvinyl chloride.

6. The device of claim 4 wherein said opaque regions are printed on said surface.

7. The device of claim 1 wherein said sheet is attached to a second sheet at one edge, and said length of yarn is held between said sheets for gauging.

* * * * *